United States Patent
Hall

[19]

[11] Patent Number: 5,929,990
[45] Date of Patent: Jul. 27, 1999

[54] FABRY-PEROT PRESSURE SENSING SYSTEM WITH RATIOED QUADRATURE PULSE DETECTION

[75] Inventor: David B. Hall, La Crescenta, Calif.

[73] Assignee: Litton Systems, Inc., Woodland Hills, Calif.

[21] Appl. No.: 08/846,503

[22] Filed: Mar. 19, 1997

[51] Int. Cl.$^6$ .................................................. G01B 9/02
[52] U.S. Cl. ........................................ 356/345; 356/352
[58] Field of Search .................................. 356/345, 352; 250/227.19, 227.21, 227.23, 227.27; 385/12, 14

[56] References Cited

U.S. PATENT DOCUMENTS

| | | | |
|---|---|---|---|
| 4,283,144 | 8/1981 | McLandrich . | |
| 4,873,989 | 10/1989 | Einzig | 356/352 |
| 4,897,542 | 1/1990 | Dakin et al. | 250/227.21 |
| 5,200,795 | 4/1993 | Kim et al. . | |
| 5,367,583 | 11/1994 | Sirkis | 356/352 |

OTHER PUBLICATIONS

Halg, B. "A Silicon Pressure Sensor with an Interferometric Optical Readout", *1991 International Conference on Solid State Sensors and Actuators*, IEEE Catalogue No. 91CH2817–5, pp. 682–684 (1991).

Bush, Jeff, et al. "Low Cost Optic Interferometric Microphones and Hydrophones", SPIE vol. 2292. *Fiber Optic and Laser Sensors XII*, pp. 83–93 (1994).

Lourenco et al, "Data Processing for Intensity Based Fiber Optic Sensors", Engineering & Laboratory Notes, (1996).

*Primary Examiner*—Samuel A. Turner
*Attorney, Agent, or Firm*—Klein & Szekeres, LLP

[57] ABSTRACT

A pressure sensing system employs a plurality of pulsed, single-wavelength optical signal sources, each emitting a distinct wavelength, whereby a multiplexed incident beam is generated. The incident beam is split into a first portion directed to first photodetector means that generate a reference signal for each wavelength, and a second portion that interrogates one or more Fabry-Perot pressure sensors. The interrogation beam portion is phase-modulated by gap width variations in the sensor(s), and is transmitted to second photodetector means that generate a measured intensity signal for each wavelength. For each wavelength, the ratio of the measured intensity signal to the reference intensity signal is taken, and yields two terms, one of which is an interference term that is proportional to the cosine of the Fabry-Perot phase shift angle $\phi$, which is a function of the gap width. By choosing wavelengths that are in quadrature relationship for a nominal Fabry-Perot gap width, the algebraic differences can be taken among the ratios to yield two expressions proportional, respectively, to the cosine and sine of the phase shift angle $\phi$. An arctangent calculation is used to obtain the measure of $\phi$, which is proportional to the gap width, which, in turn, is a known function of the pressure applied to the sensor. The optical sources may be pulsed sequentially to provide a time division-multiplexed incident beam, or simultaneously to provide a wavelength division-multiplexed incident beam.

29 Claims, 3 Drawing Sheets

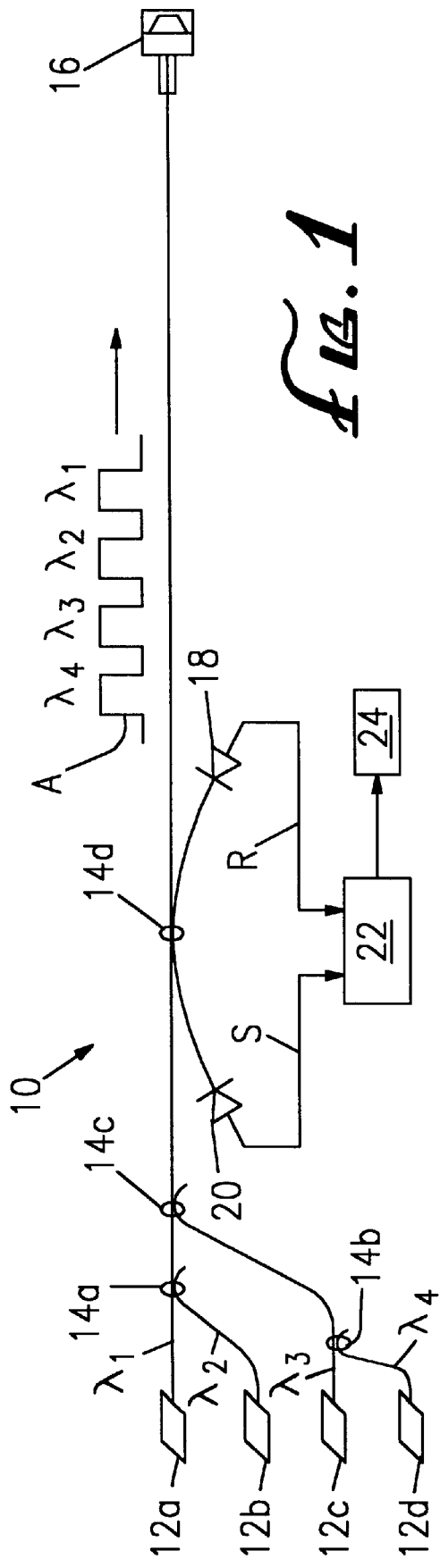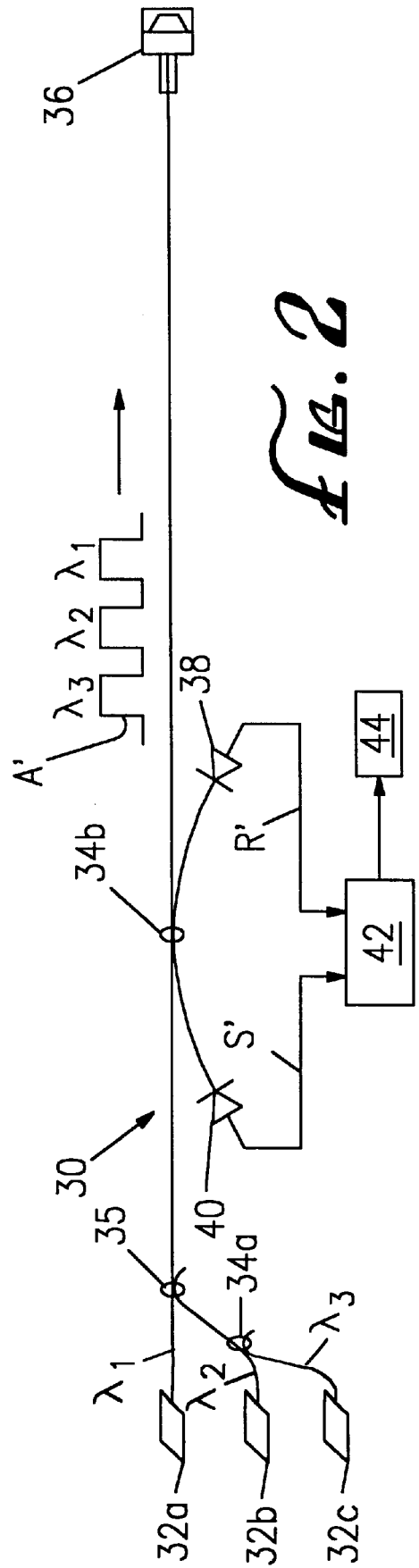

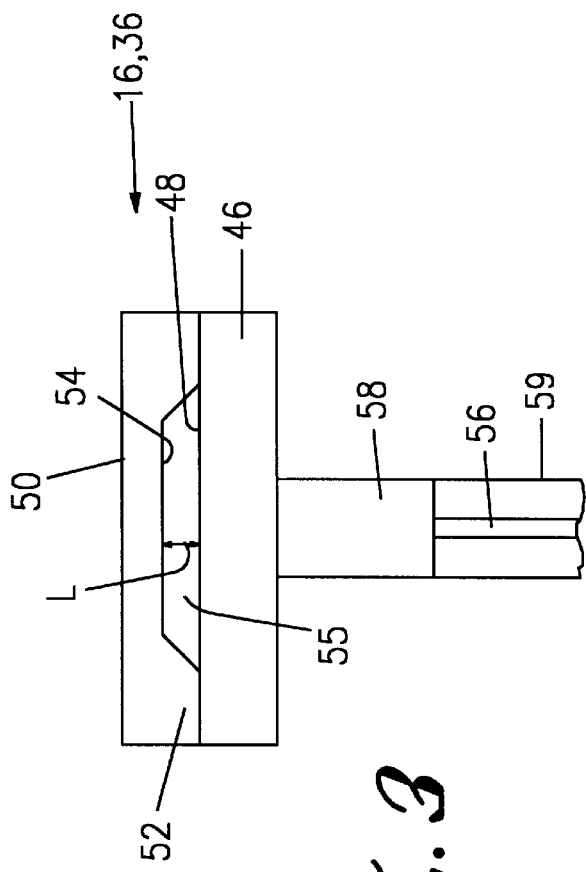
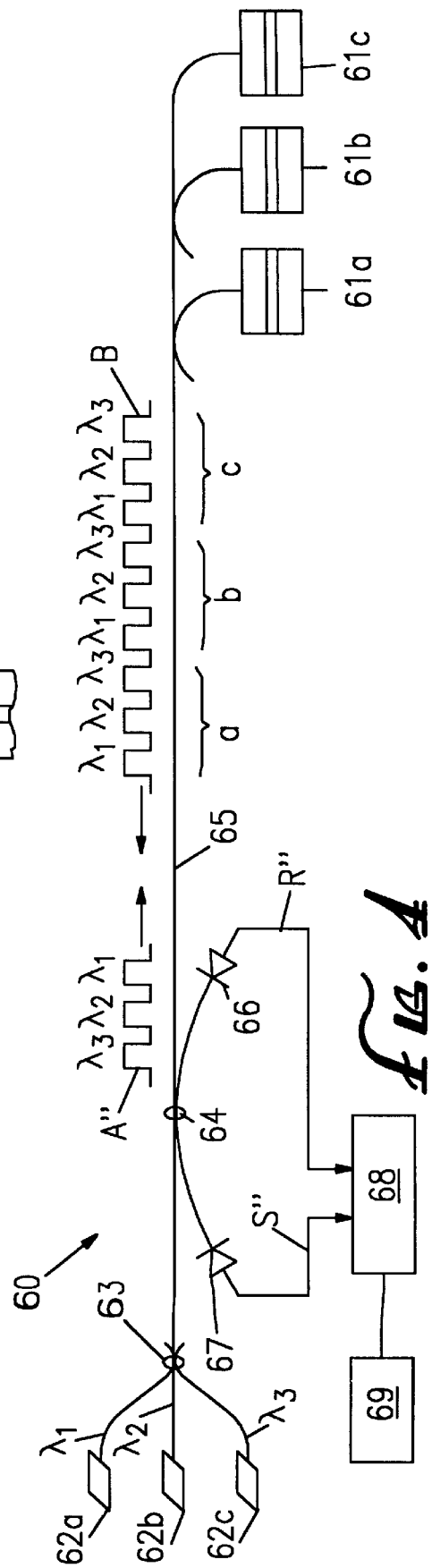
Fig. 3
Fig. 4

FABRY-PEROT PRESSURE SENSING SYSTEM WITH RATIOED QUADRATURE PULSE DETECTION

CROSS-REFERENCE TO RELATED APPLICATIONS

Not Applicable

FEDERALLY SPONSORED RESEARCH OR DEVELOPMENT

Not Applicable

BACKGROUND OF THE INVENTION

The present invention relates to the field of optical sensor systems that employ the detection of interference-induced phase differences resulting from the operation of a physical parameter to be measured on an optical sensor. More specifically, the present invention relates to a coherent fiber-optic system employing a Fabry-Perot pressure sensor to measure pressures (such as those resulting from the propagation of an acoustic wave through a medium) with a high degree of accuracy and reliability under adverse environmental conditions.

Coherent fiber-optic systems for the sensing and measurement of physical parameters are well-known in the art. See, for example, U.S. Pat. No. 5,200,795—Kim et al. Many of these prior art systems are plagued by one or more problems, such as high cost, insufficient accuracy, and poor-reliability under adverse conditions.

One type of system that has shown promise in overcoming such problems is that which employs miniature silicon Fabry-Perot pressure sensors, of the type described in Hälg, "A Silicon Pressure Sensor with an Interferometric Optical Readout", 1991 *International Conference on Solid State Sensors and Actuators*, IEEE Catalogue No. 91CH2817-5, pp. 682–684 (1991). A system employing such a sensor is described in Bush et al., "Low Cost Optic Interferometric Microphones and Hydrophones", SPIE Vol. 2292, *Fiber Optic and Laser Sensors XII*, pp. 83–93 (1994). The system contemplated by Bush et al. would employ two or more steady-state LED's, emitting different wavelengths, as the optical signal sources. It is believed that, in practice, this approach may yield less than optimal results in terms of stability and accuracy, due to, for example, instabilities in the output of the LED's. In addition, the mechanism for demodulating the pressure-modulated optical signal may be amenable to further simplification and cost reduction.

It would therefore be advantageous to provide an optical pressure sensor system, employing Fabry-Perot sensors, that is low-cost, and highly accurate, stable, and reliable, even in an adverse operational environment.

SUMMARY OF THE INVENTION

Broadly, the present invention is a Fabry-Perot pressure sensing system employing a plurality of pulsed coherent optical signal sources (preferably infrared lasers) each emitting a source signal of a distinct wavelength, whereby a multiplexed incident beam is generated. The incident beam is split so that a portion of it interrogates one or more Fabry-Perot pressure sensors, and the remainder of it is diverted to first, or reference photodetector means, which generate a reference intensity signal for each wavelength. The interrogation portion of the incident beam is phase-modulated by the pressure-induced gap variations in the Fabry-Perot sensor(s), and is returned to second, or measurement photodetector means, which generate a measured intensity signal for each wavelength. For each wavelength, the ratio of the measured intensity signal to the reference intensity signal is taken, and yields two separate terms, one of which is a time-averaged term independent of the Fabry-Perot gap width, and the other of which is an interference term that is proportional to the cosine of the Fabry-Perot phase shift angle, which is a function of the gap width. By choosing wavelengths that are in quadrature relationship for a given fixed Fabry-Perot gap width, the algebraic differences can be taken among the ratios to eliminate the time-averaged term and to yield two expressions proportional, respectively, to the cosine and sine of the phase shift angle measured by the Fabry-Perot sensor. The appropriate arctangent routine then is used to obtain the measure of the phase shift angle, which is proportional to the Fabry-Perot gap width, which, in turn, is a substantially linear function of the pressure applied to the sensor.

More specifically, assuming that the number of different wavelengths is designated by n, the total reflected signal intensity $S_k$ for each wavelength comprises the sum of a time-average signal intensity $S_k(DC)$ and an interferometric interference component $S_k(Mod) \cos \phi_k$, where k=1 to n, and where $\phi$ is a function of the gap width L, which, in turn, is a function of the sensed pressure. The reference signal intensity may be expressed as $R_k$, so that the ratioed signal intensity $S_{kl/Rk}$ (designated $I_k$) may be expressed as $A+B \cos \phi_k$.

Selecting, for example, four wavelengths in quadrature, and arbitrarily defining one of the phase shift angles $\phi_k$ as a "base" phase shift angle $\phi$ (from which the remaining phase shift angles may be derived from the predefined quadrature relationship), the ratioed signal intensities $I_1$, $I_2$, $I_3$, and $I_4$ may be expressed, respectively, as:

$I_1 = A + B \cos \phi$ $I_2 = A + B \cos (\phi + \pi/2) = A - B \sin \phi$ $I_3 = A + B \cos (\phi + \pi) = A - B \cos \phi$ $I_4 = A + B \cos (\phi + 3\pi/2) = A + B \sin \phi$ Therefore, $I_1 - I_3 = 2B \cos \phi$, and $I_4 - I_2 = 2B \sin \phi$, whereby $\phi = \arctan [(I_4 - I_2)/(I_1 - I_3)]$.

As will be demonstrated in the detailed description that follows, for any given nominal wavelength used as a "base" wavelength $\lambda$, and for any selected wavelength interval $\Delta\lambda$ between each adjacent pair of the n selected wavelengths, a nominal gap width $L_0$ can be selected to provide n wavelengths in quadrature relationship.

In a preferred embodiment, the optical signal sources are infrared lasers that are pulsed in a predetermined sequence, to produce a time division-multiplexed incident beam, comprising a pulse of each wavelength in the predetermined sequence. The reference portion of the incident beam is directed to a single reference photodetector that generates a reference signal for each wavelength, and the modulated interrogation portion is directed to a single measurement photodetector that generates a measured intensity signal for each wavelength. The measurement photodetector receives the modulated pulse of each wavelength in the same sequence as the pulses in the incident beam. The ratio of the measured intensity signal to the reference intensity signal is taken for each wavelength, as described above. If multiple sensors are employed, they are separated by at least a minimum interval along an optical delay line, so that the measurement photodetector receives modulated interrogation signals from each sensor in turn.

In an alternative embodiment, multiple lasers, each emitting a separate and distinct wavelength, are pulsed simultaneously, and a wavelength division-multiplexed (WDM) incident beam is produced. The incident beam is split into a reference portion that is directed, through a first WDM optical coupler, to multiple reference photodetectors (one for each wavelength), and an interrogation portion that is directed to multiple Fabry-Perot pressure sensors spaced at set intervals along an optical delay line. The modulated interrogation portion is then directed, through a second WDM optical coupler, to multiple measurement photodetectors (one for each wavelength). The WDM optical couplers split the reference beam portion and the modulated interrogation beam portion into their respective wavelength components, so that each reference photodetector and each measurement photodetector receive only one of the wavelengths. There is thus a reference intensity signal and a measured intensity signal for each wavelength, and ratioed intensity signal can be produced for each wavelength, as described above.

BRIEF DESCRIPTION OF THE DRAWINGS

FIG. 1 is a schematic representation of a preferred embodiment of the present invention;

FIG. 2 is a schematic representation of a simplified version of the preferred embodiment;

FIG. 3 is a simplified, semi-schematic representation of one at type of Fabry-Perot pressure sensor that can be used in the present invention;

FIG. 4 is a schematic representation of another version of the preferred embodiment, adapted for use with multiple pressure sensors.

DETAILED DESCRIPTION OF THE INVENTION

Figure 5:
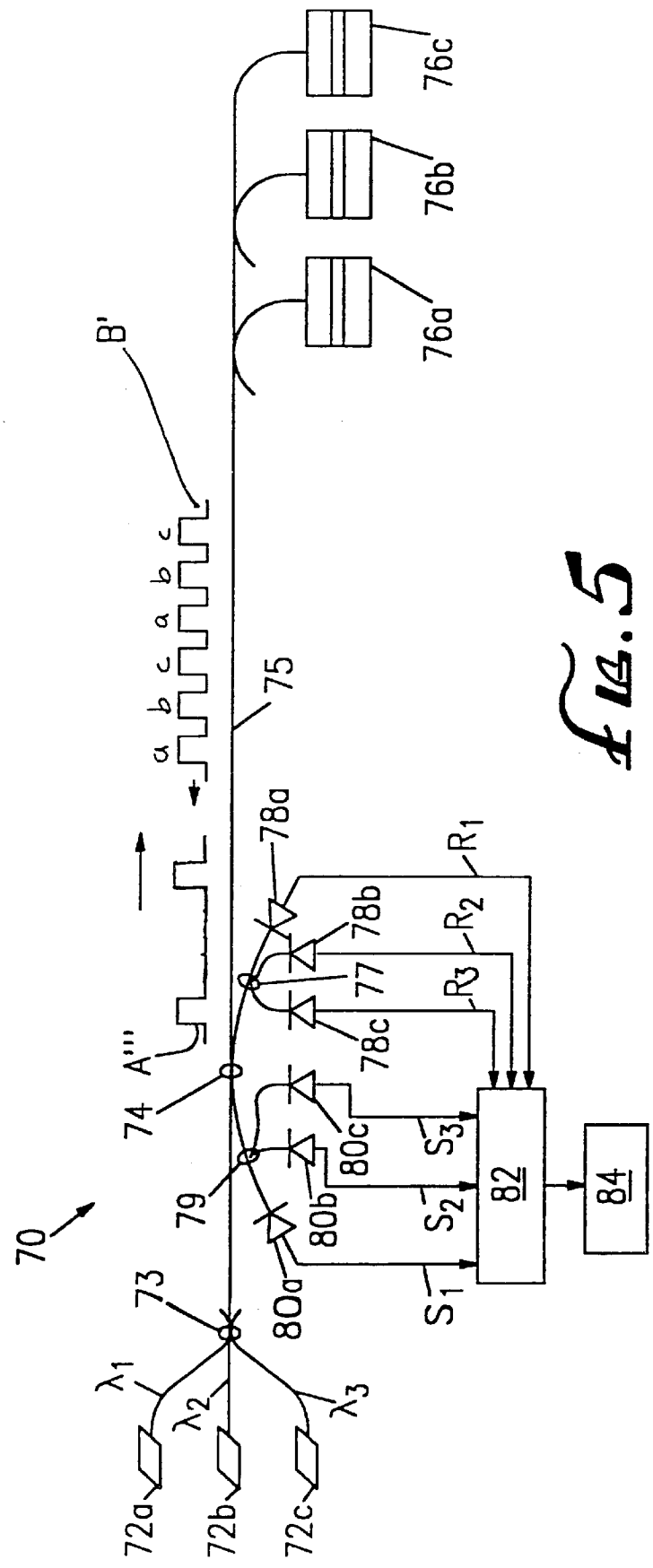
FIG. 5 is an alternative embodiment of the present invention.

Referring first to FIG. 1, a pressure sensing system 10 in accordance with a preferred embodiment of the present invention is illustrated schematically. The system 10 includes an array of four lasers 12a, 12b, 12c, and 12d, respectively emitting optical signals of approximately equal amplitude, with separate and distinct emitted wavelengths $\lambda_1$, $\lambda_2$, $\lambda_3$, and $\lambda_4$, equally spaced by an interval $\Delta\lambda$. The wavelengths are preferably in the infrared region, and more preferably in the range of about 1.30 microns to about 1.55 microns, although wavelengths as short as approximately 0.8 microns may be used. Indeed, any wavelength that can be propagated in fiber optic lines can be used. In the preferred embodiment, distributed feedback diode lasers are employed; such lasers are available from several commercial sources. The optical signals from the lasers 12a, 12b, 12c, and 12d are sequentially pulsed in a predetermined sequence, with pulse lengths of about 10 nanoseconds to about 100 nanoseconds. The lasers may be directly pulsed, or they may be energized continuously, with each of the resultant beams being separately pulsed by a lithium niobate amplitude modulator (not shown), of the type available from such sources as Uniphase Telecommunications Products, of Connecticut. Other equivalent pulsing mechanisms, well known in the art, may also be employed. The pulse sequence may be under the control of a timing or clock circuit (not shown), as is well known in the art.

The signals from the first laser 12a and the second laser 12b are transmitted, via suitable fiber optics, to a first 3 dB directional optical coupler 14a, while the signals from the third laser 12c and the fourth laser 12d are similarly transmitted to a second 3 dB directional optical coupler 14b. The output signals from the first and second optical couplers 14a, 14b are then transmitted to a third 3 dB directional optical coupler 14c. The output signal from the third optical coupler 14c is a time division-multiplexed (TDM) incident beam, in which the pulses of the four wavelengths $\lambda_1$, $\lambda_2$, $\lambda_3$, and $\lambda_4$ are of substantially equal amplitude or intensity, as indicated by the waveform A in FIG. 1. Alternatively, a single one-by-four optical coupler (not shown) may provide the same functions as the optical couplers 14a, 14b, 14c, if desired.

From the third optical coupler 14c, the incident beam is fiber-optically conducted to a fourth 3 dB directional optical coupler 14d, which splits the beam into two incident beam portions of substantially equal amplitude or intensity. One incident beam portion constitutes an interrogation beam that is fiber-optically conducted to a low-finesse Fabry-Perot pressure sensor 16, while the other incident beam portion constitutes a reference beam that is fiber-optically transmitted to a first, or reference, photodetector 18. The reference photodetector 18, in turn, converts the reference beam into a first electrical signal, or reference signal R, for purposes to be described below. As discussed in detail below, the interrogation beam is phase-modulated by the Fabry-Perot pressure sensor 16, and it is then reflected back from the pressure sensor 16, via an optical fiber, to a second, or measurement photodetector 20, which receives the modulated pulses of the wavelengths $\lambda_1$, $\lambda_2$, $\lambda_3$, and $\lambda_4$ in the same sequence as the pulses in the incident beam. The measurement photodetector 20 converts the reflected, modulated interrogation beam into a second electrical signal, or measured intensity signal S, which, for each wavelength, has an amplitude proportional to the measured intensity of the reflected interrogation beam.

The reference signal R and the measured intensity signal S are then input to a microcomputer 22, of any suitable conventional design, as is well-known in the art, the signals R and S being analog signals that are first digitized by conventional means. The microcomputer 22 is programmed to obtain the ratio of the amplitude of the measured intensity signal S to that of the reference signal R for each of the wavelengths $\lambda_1$, $\lambda_2$, $\lambda_3$, and $\lambda_4$, thereby to yield two separate terms, one of which is a time-averaged term independent of the gap width of the Fabry-Perot pressure sensor 16, and the other of which is an interference term that is proportional to the cosine of the Fabry-Perot phase shift angle, which is a known function of the gap width. Computer programs that can perform these functions are known in the art.

By transmitting the four wavelengths $\lambda_1$, $\lambda_2$, $\lambda_3$, and $\lambda_4$ in quadrature relationship for a given fixed nominal Fabry-Perot gap width $L_0$, the algebraic differences can be taken among the ratios to eliminate the time-averaged term and to yield two expressions proportional, respectively, to the cosine and sine of the phase shift angle measured by the Fabry-Perot sensor 16. The appropriate arctangent routine then is used to obtain the measure of the phase shift angle, which is proportional to the Fabry-Perot gap width L, which, in turn, is a substantially linear function of the pressure applied to the sensor 16.

More specifically, for the four wavelengths $\lambda_1$, $\lambda_2$, $\lambda_3$, and $\lambda_4$, the total reflected interrogation beam intensity $S_k$, for each of k wavelengths, comprises the sum of a time-averaged signal intensity component $S_k(DC)$ and an interferometric interference component. For a low-finesse Fabry- Perot sensor, the interferometric component is well-approximated as a cosine function, which may be expressed as $S_k(\text{Mod})\cos\phi_k$, where k=1 to 4, and where $\phi$ a phase shift angle that is a function of the Fabry-Perot gap width L. The reference signal intensity may be expressed as $R_k$, so that the ratioed signal intensity $S_k/R_k$ (which may be designated "$I_k$" to avoid confusion) may be expressed as $S_k(\text{DC})/R_k + S_k(\text{Mod})\cos\phi_k/R_k$, or, alternatively, as $A+B\cos\phi_k$. Since the Fabry-Perot pressure sensor 16 produces no polarization fading of the optical signal emerging from it (i.e., the reflected, modulated interrogation beam), the time-averaged component $S_k(\text{DC})$ and the interferometric interference component $S_k(\text{Mod})\cos\phi_k$ of that signal, when both divided by the reference signal $R_k$, produce coefficients A and B, as defined above, that are independent of the laser which generates each of the initial optical signals. Taking the difference between two signals cancels the time-averaged coefficient A to yield the two expressions that are respectively proportional to the cosine and sine of the shift angle measured by the Fabry-Perot pressure sensor 16.

For example, for four wavelengths $\lambda_1$, $\lambda_2$, $\lambda_3$, and $\lambda_4$ that are in quadrature, and arbitrarily defining one of the phase shift angles $\phi_k$ as a "base" phase shift angle $\phi$ (from which the remaining phase shift angles may be derived from the predefined quadrature relationship), the phase shift angles would be, respectively:

$\phi_1 = \phi$ $\phi_2 = \phi + \pi/2$ $\phi_3 = \phi + \pi$ $\phi_4 = \phi + 3\pi/2$ There would thus be four ratioed signal intensities $I_1$, $I_2$, $I_3$, and $I_4$ that may be expressed, respectively, as:

$I_1 = A + B\cos\phi$ $I_2 = A + B\cos(\phi+\pi/2) = A - B\sin\phi$ $I_3 = A + B\cos(\phi+\pi) = A - B\cos\phi$ $I_4 = A + B\cos(\phi+3\pi/2) = A + B\sin\phi$ Therefore, $I_1 - I_3 = 2B\cos\phi$, and $I_4 - I_2 = 2B\sin\phi$, whereby $\phi = \arctan[(I_4-I_2)/(I_1-I_3)]$.

For any given wavelength used as a "base" wavelength $\lambda$, and for any selected fixed, constant interval $\Delta\lambda$ between each adjacent pair of the four selected wavelengths, a nominal gap width $L_0$ can be selected to provide four wavelengths $\lambda_1$, $\lambda_2$, $\lambda_3$, and $\lambda_4$ in quadrature relationship. This can be demonstrated as follows:

Let the first wavelength $\lambda_1 = \lambda$, and let the second wavelength $\lambda_2 = \lambda - \Delta\lambda$. For a gap width L in the Fabry-Perot pressure sensor 16, a "round trip" back and forth across the gap equals a distance 2L. The nominal gap width $L_0$ can be selected so that the number of wavelengths $\lambda$ in each round trip of distance $2L_0$ is equal to a positive integer N, so that:

$N\lambda = 2L_0$, or $N = 2L_0/\lambda$

If the first and second wavelengths are in quadrature, then there will be N+¼ of the second wavelength $(\lambda - \Delta\lambda)$ in each round trip, expressed as follows:

$(N+¼)(\lambda - \Delta\lambda) = 2L_0$

Algebraically, this equation expands to:

$N\lambda + ¼\lambda - N\Delta\lambda - ¼\Delta\lambda - 2L_0 = 0$

Substituting for N and combining like terms yield:

$¼\lambda - 2L_0\Delta\lambda/\lambda - ¼\Delta\lambda = 0$

Since $¼\Delta\lambda << ¼\lambda$, the last term can be dropped for a first order approximation, which can be expressed as:

$¼\lambda = 2L_0\Delta\lambda/\lambda$, or $L_0 = \lambda^2/8\Delta\lambda$

Thus, once a base wavelength $\lambda$ (which may be, for example, the first wavelength $\lambda_1$) and the interval $\Delta\lambda$ are selected, a nominal gap width $L_0$ can be selected that yields the four wavelengths $\lambda_1$, $\lambda_2$, $\lambda_3$, and $\lambda_4$ in quadrature relationship.

By way of specific example, if a base wavelength $\lambda_1$ of 1.55 microns is chosen, and an interval $\Delta\lambda$ of 0.005 microns is selected, a nominal gap width $L_0$ of 60 microns will yield four wavelengths $\lambda_1$, $\lambda_2$, $\lambda_3$, and $\lambda_4$ (of 1.550, 1.545, 1.540, and 1.535 microns, respectively) in quadrature relationship.

As discussed above, once the base phase shift angle $\phi$ is determined, the gap width in response to pressures applied to the sensor 16 can be determined from the relationship $L = \lambda\phi/4\pi$, where L is the gap width as a function of pressure applied to the sensor 16, where $\phi$ is the base phase shift angle in radians, and where $\lambda$ is the base wavelength, as defined above. A gap width-versus-pressure curve can be generated empirically for the pressure sensor 16, and this curve can be stored as a look-up table in a ROM (not shown) in the microcomputer 22, whereby a pressure value can be generated for each calculated value of L. This value can be output to a display device 24 and/or stored in the memory of the microcomputer 22.

All of the above calculations and logical operations can be performed by the microcomputer 22 using software that either is purely conventional, or that is well within the ordinary level of skill in the programming arts.

The system described above can thus provide a substantially instantaneous pressure reading in real time or near real time, with a high degree of accuracy, reliability, and stability.

FIG. 2 illustrates a pressure sensing system 30 in accordance with a simplified version of the above-described preferred embodiment. In this version, only three lasers 32a, 32b, and 32c are used, emitting three separate and discrete wavelengths $\lambda_1$, $\lambda_2$, and $\lambda_3$, respectively, in sequentially-pulsed infrared beams, as described above, with a fixed, constant wavelength interval $\Delta\lambda$ separating each adjacent pair of wavelengths. The signals from the second laser 32b and the third laser 32c are transmitted, by fiber optics, to a first 3 dB directional optical coupler 34a. The signal from the first laser 32a and the output signal from the first 3 dB optical coupler 34a are directed, via fiber optics, to a 5 dB directional optical coupler 35. The output signal from the 5 dB optical coupler 35 is a time division-multiplexed (TDM) incident beam, in which the pulses of the three wavelengths $\lambda_1$, $\lambda_2$, and $\lambda_3$ are of substantially equal amplitude or intensity, as indicated by the waveform A' in FIG. 2. Alternatively, a single one-by-three optical coupler (not shown) can be employed instead of the optical couplers 34a and 35.

From the 5 dB optical coupler 35, the incident beam is fiber-optically conducted to a second 3 dB directional optical coupler 34b, which splits the beam into two incident beam portions of substantially equal amplitude or intensity. One incident beam portion constitutes an interrogation beam that is fiber-optically conducted to a low-finesse Fabry-Perot pressure sensor 36, while the other incident beam portion constitutes a reference beam that is fiber-optically transmitted to a first, or reference, photodetector 38. The reference photodetector 38, in turn, converts the reference beam into a first electrical signal, or reference signal R'. The interrogation beam is phase-modulated by the Fabry-Perot pressure sensor 36, and it is then reflected back from the pressure sensor 36, via an optical fiber, to a second, or measurement photodetector 40, which receives the modulated pulses of the wavelengths $\lambda_1$, $\lambda_2$, and $\lambda_3$ in the same sequence as the pulses in the incident beam. The measurement photodetector 40 converts the reflected interrogation beam into a second electrical signal, or measured intensity signal S', which, for each wavelength, has an amplitude proportional to the measured amplitude or intensity of the reflected interrogation beam.

The reference signal R' and the measured intensity signal S' are then input to a microcomputer 42, the signals R' and S' being analog signals that are first digitized by conventional means. The microcomputer 42 is programmed to obtain the ratio of the amplitude of the measured intensity signal S' to that of the reference signal R' for each of the wavelengths $\lambda_1$, $\lambda_2$, and $\lambda_3$, thereby to yield two separate terms, one of which is a time-averaged term independent of the gap width of the Fabry-Perot pressure sensor 36, and the other of which is an interference term that is proportional to the cosine of the Fabry-Perot phase shift angle, which is a function of the gap width.

As described above, the three wavelengths $\lambda_1$, $\lambda_2$, and $\lambda_3$ are transmitted in quadrature relationship for a given fixed nominal Fabry-Perot gap width $L_0$, whereby the algebraic differences can be taken among the ratios to eliminate the time-averaged term and to yield two expressions proportional, respectively, to the sine and cosine of the phase shift angle measured by the Fabry-Perot sensor 36. The appropriate arctangent routine then is used to obtain the measure of the phase shift angle, which is proportional to the Fabry-Perot gap width L, which, in turn, is a substantially linear function of the pressure applied to the sensor 36.

More specifically, for the three wavelengths $\lambda_1$, $\lambda_2$, and $\lambda_3$, the total reflected interrogation beam intensity $S_k'$ for each wavelength comprises the sum of a time-averaged signal intensity component $S_k'(DC)$ and an interferometric interference component that may be expressed (for a low-finesse Fabry-Perot sensor) as $S_k'(Mod)\cos(\phi_k+\pi/4)$, where k=1 to 3, and where $\phi$ is the phase shift angle that is a function of the gap width L. The reference signal intensity may be expressed as $R_k'$, so that the ratioed signal intensity $S_k'/R_k'$ (designated $I_k'$) may be expressed as:

$$S_k'(DC)/R_k'+S_k'(Mod)\cos(\phi_k+\pi/4)/R_k',$$

or, alternatively, as:

$$A+B \cos(\phi_k+\pi/4).$$

Dividing both the time-averaged component $S_k'(DC)$ and the interferometric interference component $S_k'(Mod)\cos(\phi_k+\pi/4)$ of that signal by the reference signal intensity Rk' produces coefficients A and B, as defined above, that are independent of the laser which generates each of the initial optical signals. Taking the difference between two signals cancels the time-averaged coefficient A to yield the two expressions that are respectively proportional to the sine and cosine of the phase shift angle measured by the Fabry-Perot pressure sensor 36.

For example, for three wavelengths $\lambda_1$, $\lambda_2$, and $\lambda_3$ transmitted in quadrature relationship, and arbitrarily defining one of the phase shift angles $\phi_k$ as a "base" phase shift angle $\phi$ (from which the remaining phase shift angles may be derived from the predefined quadrature relationship), the respective phase shift angles would be as follows:

$$\phi_1=\phi$$

$$\phi_2=\phi+\pi/2$$

$$\phi_3=\phi+\pi$$

Thus, there would be three ratioed signal intensities $I_1'$, $I_2'$, and $I_3'$ that may be expressed, respectively, as:

$$I_1'=A+B \cos(\phi+\pi/4)$$

$$I_2'=A+B \cos(\phi+3\pi/4)=A+B \cos(\phi-\pi/4)$$

$$I_3'=A+B \cos(\phi+5\pi/4)=A-B \cos(\phi+\pi/4)$$

Therefore, $I_2'-I_1'=\sqrt{2}B \sin\phi$, and $I_2'-I_3'=\sqrt{2}B \cos\phi$, whereby $$\phi=\arctan[(I_2'-I_1')/(I'-I_3')]$$

As described above, for any given wavelength used as the base wavelength $\lambda$, and for any selected fixed, constant interval $\Delta\lambda$ between each adjacent pair of the three selected wavelengths, a nominal gap width $L_0$ for the Fabry-Perot pressure sensor 36 can be selected to provide the three wavelengths $\lambda_1$, $\lambda_2$, and $\lambda_3$ in quadrature relationship. Then, as described above, the pressure-responsive gap width L is calculated from the measured base phase shift angle $\phi$ and the base wavelength $\lambda$. The corresponding measured pressure value is finally derived from the calculated L value, and it can be displayed on a display device 44 or stored in the memory of the microcomputer 42.

The Fabry-Perot pressure sensors 16, 36 may be of any design. that is deemed suitable for the environment in which the systems 10, 30 would be used. Such pressure sensors are known in the art, as exemplified by the Hälg reference, *supra*, and the Bush et al. reference, *supra*, the disclosures of which are incorporated herein by-reference. For the present invention, the Fabry-Perot pressure sensor 16, 36 is preferably of the design shown in FIG. 3.

As shown in FIG. 3, the pressure sensor 16, 36 is a low-finesse Fabry-Perot cavity, comprising a flat plate 46 of optical quality glass, transparent to the wavelengths used, and having an inner surface 48 that is made partially reflective of those wavelengths, by techniques that are well known in the art. The pressure sensor 16, 36 further comprises a pressure-responsive silicon diaphragm 50 that is joined, by an annular spacer 52, to the flat plate 46 around the periphery of the inner surface 48. The diaphragm 50 has an inner surface 54 that is also partially reflective of the wavelengths used. The inner surface 54 of the diaphragm 50 is spaced from the inner surface 48 of the plate 46 by a cavity 55 that defines the Fabry-Perot gap width L, which may be expressed as follows:

$$L=L_0+\Delta L(p),$$

where $L_0$ is the nominal gap width, and $\Delta L(p)$ is the pressure-induced deviation in the gap width.

The pressure sensor 16, 36 is optically coupled to an optical fiber 56 by a graded index ("GRIN") lens 58, which may advantageously be of the type marketed by NSG America, Inc., Somerset, N.J., under the trademark "SELFOC". The GRIN lens 58 provides a collimated optical beam for entry into the cavity 55. The optical fiber 56 is advantageously supported within a coaxial ferrule 59. The assembly shown in FIG. 3 also advantageously includes alignment means (not shown), as is well known in the art, to assure that the optical signal from the cavity 55 is retroreflected back into the optical fiber 56.

FIG. 4 illustrates a pressure sensing system 60 in accordance with another variant of the preferred embodiment of the invention, wherein multiple Fabry-Perot pressure sensors 61a, 61b, 61c are employed. In this version, three lasers 62a, 62b, 62c, respectively emitting three separate and discrete wavelengths $\lambda_1$, $\lambda_2$, and $\lambda_3$, in sequentially-pulsed infrared beams, as described above, with a fixed, constant wavelength interval $\Delta\lambda$ separating each adjacent pair of wavelengths. The pulsed beams are fiber-optically conducted to a three-way optical coupler 63, the output of which is a time division-multiplexed (TDM) incident beam, in which the pulses of the three wavelengths $\lambda_1$, $\lambda_2$, and $\lambda_3$ are of substantially equal amplitude or intensity, as indicated by the waveform A" in FIG. 4.

The TDM incident beam is fiber-optically conducted to a 3 dB directional optical coupler 64 which splits the beam into two incident beam portions of substantially equal intensity. One incident beam portion constitutes an interrogation beam that is fiber-optically conducted, via a delay line 65, to each of the Fabry-Perot pressure sensors 61a, 61b, 61c, while the other incident beam portion constitutes a reference beam that is fiber-optically transmitted to a reference photodetector 66. The reference photodetector 66, in turn, converts the reference beam-into a reference signal R".

The interrogation beam is phase-modulated by the Fabry-Perot pressure sensors 61a, 61b, 61c, and it is then fiber-optically transmitted back, through the delay line 65, to a measurement photodetector 67. The measurement photodetector 67 receives the modulated pulses of the wavelengths $\lambda_1$, $\lambda_2$, and $\lambda_3$ in the same sequence as the pulses in the incident beam, and it converts the modulated interrogation signal into a measured intensity signal S", the amplitude of which, for each wavelength, is proportional to the measured amplitude or intensity of the reflected interrogation beam.

The modulated interrogation beam, transmitted along the delay line 65, is received by the measurement photodetector 67 from the three pressure sensors 61a, 61b, and 61c in a sequence that is related to the respective distances of the sensors 61a, 61b, and 61c from the measurement photodetector 67. Thus, as shown in the waveform B in FIG. 4, the first sequence of pulses from each of the three wavelengths $\lambda_1$, $\lambda_2$, and $\lambda_3$ is received from the first sensor 61a and is labeled "a"; the second sequence "b" is received from the second sensor 61b; and the third sequence "c" is received from the third sensor 61c. The physical distance between the sensors 61a, 61b, and 61c must be sufficient to prevent overlapping between the sequences a, b, and c. Thus, with the speed of light in an optical fiber being about 0.2 meters per nanosecond, for pulse durations of 10 nanoseconds, an inter-sensor separation of at least about 2 meters is required. For a pulse duration of 100 nanoseconds, the separation must be at least about 20 meters.

A measured intensity signal S" for each of the three sensors 61a, 61b, 61c is input, as it is received by the measurement photodetector 67, is input into a microcomputer 68. The three wavelengths $\lambda_1$, $\lambda_2$, and $\lambda_3$ being in quadrature, and with a fixed, constant $\Delta\lambda$, as defined above, the microcomputer 68 performs the calculations and operations described above to obtain "base" phase shift angles (as that term is defined above) $\phi_a$, $\phi_b$, and $\phi_c$ respectively corresponding to the sensors 61a, 61b, 61c, and thus to obtain a pressure reading for each of the sensors that may be output to a display device 69 and/or retained in memory in the microcomputer 68.

For example, for the modulated interrogation beam received from the sensor 61a, ratioed intensity signals $I_{1a}$, $I_{2a}$, and $I_{3a}$ are derived that are expressed as follows:

$I_{1a}=A+B \cos (\phi_a+\pi/4)$ $I_{2a}=A+B \cos (\phi_a+3\pi/4)=A+B \cos (\phi_a-\pi/4)$ $I_{3a}=A+B \cos (\phi_a+5\pi/4)=A-B \cos (\phi_a+\pi/4)$ Therefore, $I_{2a}-I_{1a}=\sqrt{2}B \sin \phi_a$, and $I_{2a}-I_{3a}=\sqrt{2}B \cos \phi_a$, whereby $\phi_a=\arctan [(I_{2a}-I_{1a})/(I_{2a}-I_{3a})]$.

A similar set of operations is employed to obtain values for $\phi_b$ and $\phi_c$.

It will be appreciated that, in this variation of the preferred embodiment, any number of lasers and Fabry-Perot sensors may be employed.

FIG. 5 illustrates a pressure sensing system 70 in accordance with a second embodiment of the invention, in which multiple Fabry-Perot pressure sensors are employed, and in which multiple lasers are simultaneously pulsed to provide a wavelength division-multiplexed incident beam.

As shown in FIG. 5, three lasers 72a, 72b, and 72c are employed, respectively emitting simultaneously-pulsed infrared beams in three separate, discrete wavelengths $\lambda_1$, $\lambda_2$, and $\lambda_3$, with a fixed, constant wavelength interval $\Delta\lambda$ separating each adjacent pair of wavelengths. The pulsed beams are fiber-optically conducted to a three-way optical coupler 73, the output of which is a wavelength division-multiplexed (WDM) incident beam, comprising a sequence of pulses, indicated by the waveform A'" in FIG. 5, each of which comprises equal intensity components of each of the three wavelengths $\lambda_1$, $\lambda_2$, and $\lambda_3$.

The WDM incident beam is fiber-optically conducted to a 3 dB directional optical coupler 74 which splits the beam into two incident beam portions of substantially equal amplitude or intensity. One incident beam portion constitutes an interrogation beam that is fiber-optically conducted, through a delay line 75, to each of a plurality of Fabry-Perot pressure sensors 76a, 76b, 76c, while the other incident beam portion constitutes a reference beam that is fiber-optically transmitted, through a first WDM optical coupler 77, to a plurality of reference photodetectors 78a, 78b, 78c. The first WDM optical coupler 77 splits the reference beam into its separate wavelength components, whereby each of the reference photodetectors 78a, 78b, 78c receives pulses of one of the three wavelengths $\lambda_1$, $\lambda_2$, and $\lambda_3$. The reference photodetectors 78a, 78b, 78c, in turn, respectively generate electrical reference signals $R_1$, $R_2$, and $R_3$ that represent the respective amplitudes of the three wavelengths in the reference beam. Since, in the reference beam, the amplitudes of the three wavelength components are (or should be) of substantially equal intensity, the three electrical reference signals are of substantially equal amplitude, and may thus be collectively designated "R".

The interrogation beam is phase-modulated by the Fabry-Perot pressure sensors 76a, 76b, 76c, and it is then fiber-optically transmitted back, through the delay line 75 and through a second WDM optical coupler 79, to a plurality of measurement photodetectors 80a, 80b, 80c. The pulses of the modulated interrogation beam are received by the measurement photodetectors 80a, 80b, 80c from the three pressure sensors 76a, 76b, and 76c in a sequence that is related to the respective distances of the sensors from the measurement photodetectors. Specifically, each pulse shown in the waveform A'" of FIG. 5 first interrogates the sensor 76a, then the sensor 76b, and finally the sensor 76c, thereby producing three return pulses, repectively labeled "a", "b", and "c" in the waveform B' in FIG. 5. Thus, the waveform B' shows the return pulse train for three successive interrogation pulses of the waveform A'''. The interval between the interrogation pulses of the waveform A''' must be sufficient to allow the reception of all three return pulses produced by each interrogation pulse before the next interrogation pulse is generated. The physical distance between the sensors 76a, 76b, and 76c must be sufficient to prevent overlapping between the sequences a, b, and c. Thus, with the speed of light in an optical fiber being about 0.2 meters per nanosecond, for pulse durations of 10 nanoseconds, an inter-sensor separation of at least about 2 meters is required. For a pulse duration of 100 nanoseconds, the separation must be at least about 20 meters.

The second WDM optical coupler 79 splits the modulated interrogation beam into its separate wavelength components, whereby each of the measurement photodetectors 80a, 80b, 80c receives pulses of one of the three wavelengths $\lambda_1$, $\lambda_2$, and $\lambda_3$. The measurement photodetectors 80a, 80b, 80c, in turn, respectively generate electrical measured intensity signals $S_1$, $S_2$, and $S_3$ that represent the respective amplitudes of the three wavelengths in the modulated interrogation beam. The measurement photodetectors 80a, 80b, 80c thus respectively receive the modulated pulses of the wavelengths $\lambda_1$, $\lambda_2$, and $\lambda_3$ in the same sequence as the pulses are returned from the sensors 76a, 76b, 76c, as shown by the waveform B'.

The reference signal R and the measured intensity signals $S_1$, $S_2$, and $S_3$ are input to a microcomputer 82. The three wavelengths $\lambda_1$, $\lambda_2$, and $\lambda_3$ being in quadrature, and with a fixed, constant $\Delta\lambda$, as defined above, the microcomputer 82 performs the calculations and operations described above to obtain base phase shift angles (as that term is defined above) $\phi_a$, $\phi_b$, and $\phi_c$ respectively corresponding to the sensors 76a, 76b, 76c, and thus to obtain a pressure reading for each of the sensors.

For example, for the modulated interrogation beam received from the sensor 76a, ratioed intensity signals $I_{1a}'$, $I_{2a}'$, and $I_{ea}'$ are derived that are expressed as follows:

$$I_{1a}'=A+B \cos (\phi_a+\pi/4)$$

$$I_{2a}'=A+B \cos (\phi_a+3\pi/4)=A+B \cos (\phi_a-\pi/4)$$

$$I_{3a}'=A+B \cos (\phi_a+5\pi/4)=A-B \cos (\phi_a+\pi/4)$$

Therefore, $I_{2a}'-I_{1a}'=\sqrt{2}B \sin \phi_a$, and $I_{2a}'-I_{3a}''=\sqrt{2}B \cos \phi_a$, whereby $$\phi_a=\arctan [(I_{2a}'-I_{1a}')/(I_{2a}'-I_{3a}')].$$

A similar set of operations is employed to obtain values for $\phi_b$ and $\phi_c$.

It will be appreciated that, in this second embodiment, any number of lasers and Fabry-Perot sensors may be employed. It is necessary, however, for the relative beam powers incident on the photodetectors, and the responsivities of the photodetectors, to be calibrated with respect to one another to assure that the "A" and "B" coefficients described above are independent of the particular laser being used.

From the foregoing description, it will be appreciated that the present invention is capable of providing accurate, reliable pressure measurements, in real time or near-real time, using a system that is relatively inexpensive to manufacture. Specifically, techniques for inexpensively fabricating silicon Fabry-Perot sensors, of the type employed in the present invention, are well known in the art, and the other optical components of the above-described systems may be readily available, off-the-shelf items.

While several specific embodiments and variations of the invention are described above and in the drawings, further modifications and variations may suggest themselves to those skilled in the pertinent arts. For example, although the invention has been described as employing Fabry-Perot pressure sensors to obtain a pressure measurement, modifications of the sensors to sense other parameters, such as acceleration, will be readily ascertainable. Thus, the present invention may be readily adapted to the measurement of other parameters, and it should not be limited to the sensing and measurement of pressure. Such variations and modifications should be considered within the spirit and scope of the invention, as defined in the claims that follow.

What is claimed is:

1. A system for measuring a parameter, comprising:

a source of at least three single-wavelength optical signals, each having a separate and distinct emitted wavelength, the wavelengths being separated by a fixed, constant wavelength interval;

a plurality of optical couplers that convert the single-wavelength signals into a multiplexed incident beam comprising first and second beam portions of substantially equal intensity;

first photodetection means that receive the first beam portion and generate a reference intensity signal for each of the emitted wavelengths;

at least one Fabry-Perot sensor that receives the second beam portion and that has a Fabry-Perot cavity with a gap width that varies as a known function of the value of the parameter to be measured, the gap width having a nominal gap width value at which the emitted wavelengths are in quadrature relationship, whereby the second beam portion is phase-modulated by the variation in the gap width, so that the emitted wavelengths are phase shifted by respective phase shift angles in quadrature relationship, one of the phase shift angles being a base phase shift angle that is a known function of the gap width;

second photodetection means that receive the phase-modulated second beam portion from the sensor and generate a measured intensity signal for each of the emitted wavelengths; and a computer that is responsive to each of the reference intensity signals and each of the measured intensity signals, and that is programmed to calculate (a) the base phase shift angle from the ratios of the measured intensity signal to the reference intensity signal for each of the emitted wavelengths, (b) the gap width as a function of the base phase shift angle, and (c) the parameter to be measured as a function of the gap width.

2. The system of claim 1, wherein the signal sources are pulsed in a predetermined sequence, and wherein the incident beam is a time division-multiplexed incident beam comprising pulses of the single-wavelength signals in the predetermined sequence.

3. The system of claim 1, wherein the plurality of optical couplers includes at least a first optical coupler that produces an incident beam in which the intensities of the single-wavelength signals are substantially equal, and a second optical coupler that divides the incident beam into the first and second beam portions, and that conducts the first beam portion to the first photodetection means and the second beam portion to the second photodetection means from the Fabry-Perot sensor.

4. The system of claim 3, wherein the sensor is a first Fabry-Perot sensor, the system further comprising:

at least a second Fabry-Perot sensor; and a fiber optic delay line optically and physically coupling the first and second sensors to each other and to the second photodetection means.

5. The system of claim 4, wherein the signal sources are pulsed substantially simultaneously, and wherein the incident beam is a wavelength division-multiplexed incident beam comprising a sequence of pulses, each of which comprises substantially equal intensity components of each of the emitted wavelengths.

6. The system of claim 5, wherein the first photodetection means comprises:

a first wavelength-responsive optical coupler that splits the first beam portion into components corresponding to each of the emitted wavelengths; and a first plurality of photodetectors, each responsive to one of the emitted wavelengths, each of the photodetectors generating a reference intensity signal for one of the emitted wavelengths.

7. The system of claim 6, wherein the second photodetection means comprises:

a second wavelength-responsive optical coupler that splits the second beam portion into components corresponding to each of the emitted wavelengths; and a second plurality of photodetectors, each responsive to one of the emitted wavelengths, each of the photodetectors generating a measured intensity signal for one of the emitted wavelengths.

8. The system of claim 2, wherein the plurality of optical couplers includes at least a first optical coupler that produces an incident beam in which the intensities of the single-wavelength signals are substantially equal, and a second optical coupler that divides the incident beam into the first and second beam portions, and that conducts the first beam portion to the first photodetection means and the second beam portion to the second photodetection means from the Fabry-Perot sensor.

9. The system of claim 8, wherein the sensor is a first Fabry-Perot sensor, the system further comprising:

at least a second Fabry-Perot sensor; and a fiber optic delay line optically and physically coupling the first and second sensors to each other and to the second photodetection means.

10. A system for measuring a parameter, comprising:

at least three pulsed optical signal sources that emit at least three single-wavelength optical signals having separate and distinct emitted wavelengths separated by a fixed, constant wavelength interval, the signal sources being pulsed in a predetermined sequence;

a plurality of optical couplers that convert the single-wavelength signals into a time division-multiplexed incident beam comprising first and second beam portions of substantially equal intensity, each comprising pulses of the single-wavelength signals in the predetermined sequence;

a first photodetector that receives the first beam portion and generates a reference intensity signal for each of the emitted wavelengths;

at least one Fabry-Perot sensor that receives the second beam portion and that has a Fabry-Perot cavity with a gap width that varies as a known function of the value of the parameter to be measured, the gap width having a nominal gap width value at which the emitted wavelengths are in quadrature relationship, whereby the second beam portion is phase-modulated by the variation in the gap width, so that the emitted wavelengths are phase-shifted by respective phase shift angles in quadrature relationship, one of the phase shift angles being a base phase shift angle that is a known function of the gap width;

a second photodetector that receives the phase-modulated second beam portion from the sensor and generates a measured intensity signal for each of the emitted wavelengths; and a computer that is responsive to each of the reference intensity signals and each of the measured intensity signals, and that is programmed to calculate (a) the base phase shift angle from the ratios of the measured intensity signal to the reference intensity signal for each wavelength, (b) the gap width as a function of the base phase shift angle, and (c) the parameter to be measured as a function of the gap width.

11. The system of claim 10, wherein the plurality of optical couplers includes at least a first optical coupler that produces an incident beam in which the intensities of the single-wavelength signals are substantially equal, and a second optical coupler that divides the incident beam into the first and second beam portions, and that conducts the first beam portion to the first photodetector and the second beam portion to the second photodetector from the Fabry-Perot sensor.

12. The system of claim 11, wherein the sensor is a first Fabry-Perot sensor, the system further comprising:

at least a second Fabry-Perot sensor; and a fiber optic delay line optically and physically coupling the first and second sensors to each other and to the second photodetector.

13. A system for measuring a parameter, comprising:

at least three simultaneously-pulsed optical signal sources that emit at least three single-wavelength optical signals having separate and distinct emitted wavelengths separated by a fixed, constant wavelength interval;

a plurality of optical couplers that convert the single-wavelength signals into a wavelength division-multiplexed incident beam comprising first and second beam portions of substantially equal intensity, the first and second beam portions each comprising a sequence of pulses, each of which comprises substantially equal intensity components of each of the emitted wavelengths;

first photodetection means that receive the first beam portion and generate a reference intensity signal for each of the emitted wavelengths;

a plurality of Fabry-Perot sensors, physically and optically coupled to each other by a fiber-optic delay line, each of the sensors receiving the second beam portion from the delay line, each of the sensors having a Fabry-Perot cavity with a gap width that varies as a known function of the value of the parameter to be measured, the gap width having a nominal gap width value at which the emitted wavelengths are in quadrature relationship, whereby the second beam portion is phase-modulated by the variation in the gap width, so that the emitted wavelengths are phase-shifted by respective phase shift angles in quadrature relationship, one of the phase shift angles being a base phase shift angle that is a known function of the gap width;

second photodetection means that receive the phase-modulated second beam portion from the sensor and generate a measured intensity signal for each of the emitted wavelengths; and a computer that is responsive to each of the reference intensity signals and each of the measured intensity signals, and that is programmed to calculate (a) the base phase shift angle from the ratios of the measured intensity signal to the reference intensity signal for each wavelength, (b) the gap width as a function of the base phase shift angle, and (c) the parameter to be measured as a function of the gap width.

14. The system of claim 13, wherein the plurality of optical couplers includes at least a first optical coupler that produces an incident beam in which the intensities of the single-wavelength signals are substantially equal, and a second optical coupler that divides the incident beam into the first and second beam portions, and that conducts the first beam portion to the first photodetection means and the second beam portion to the second photodetection means from the Fabry-Perot sensors.

15. The system of claim 13, wherein the first photodetection means comprises:

a first wavelength-responsive optical coupler that splits the first beam portion into components corresponding to each of the emitted wavelengths; and a first plurality of photodetectors, each responsive to one of the emitted wavelengths, each of the photodetectors generating a reference intensity signal for one of the emitted wavelengths.

16. The system of claim 15, wherein the second photodetection means comprises:

a second wavelength-responsive optical coupler that splits the second beam portion into components corresponding to each of the emitted wavelengths; and a second plurality of photodetectors, each responsive to one of the emitted wavelengths, each of the photodetectors generating a measured intensity signal for one of the emitted wavelengths.

17. A method for measuring a parameter, comprising the steps of:

providing at least three single-wavelength pulsed optical signals having at least three separate and distinct emitted wavelengths that are separated by a fixed, constant wavelength interval;

multiplexing the single-wavelength signals to provide a pulsed incident beam in which the intensities of the emitted wavelengths are substantially equal;

splitting the incident beam into a first beam portion and a second beam portion of substantially equal intensities;

detecting the first beam portion and generating a reference intensity signal indicative of the intensity of each of the emitted wavelengths in the first beam portion;

directing the second beam portion to a Fabry-Perot sensor that has a Fabry-Perot cavity with a gap width that varies as a known function of the value of the parameter to be measured, the gap width having a nominal gap width value at which the emitted wavelengths are in quadrature relationship, whereby the second beam portion is phase-modulated by the variation in the gap width, so that the emitted wavelengths are phase-shifted by respective phase shift angles in quadrature relationship, one of the phase shift angles being a base phase shift angle that is a known function of the gap width;

detecting the phase-modulated second beam portion received from the sensor and generating a measured intensity signal indicative of the intensity of each of the emitted wavelengths in the phase-modulated second beam portion;

calculating the base phase shift angle from the ratios of the measured intensity signal to the reference intensity signal for each of the emitted wavelengths;

calculating the gap width as a function of the base phase shift angle; and determining the parameter to be measured as a function of the gap width.

18. The method of claim 17, wherein the single-wavelength signals are pulsed in a predetermined sequence, and wherein the multiplexing step provides a time division-multiplexed incident beam comprising pulses of the single-wavelength signals in the predetermined sequence.

19. The method of claim 18, wherein each of the first and second beam portions comprises a series of single-wavelength pulses in the predetermined sequence.

20. The method of claim 17, wherein the single-wavelength signals are pulsed substantially simultaneously and wherein the multiplexing step provides a wavelength division-multiplexed incident beam comprising a sequence of pulses, each of which comprises substantially equal intensity components of each of the emitted wavelengths.

21. The method of claim 20, wherein each of the first and second beam portions comprises a sequence of pulses, each of which comprises substantially equal intensity components of each of the emitted wavelengths.

22. The method of claim 21, wherein the step of detecting the first beam portion comprises the steps of:

splitting each of the pulses in the first beam portion into components corresponding to each of the emitted wavelengths; detecting each of the emitted wavelengths separately; and generating a separate reference intensity signal for each of the emitted wavelengths.

23. The method of claim 21, wherein the step of detecting the phase-modulated second beam portion comprises the steps of:

splitting each of the pulses in the phase-modulated second beam portion into components corresponding to each of the emitted wavelengths;

detecting each of the emitted wavelengths separately; and generating a separate measured intensity signal for each of the emitted wavelengths.

24. A method for measuring a parameter, comprising the steps of:

providing a Fabry-Perot sensor that has a Fabry-Perot cavity with a gap width that varies as a known function of the value of the parameter to be measured;

generating an optical beam comprising a series of single-wavelength pulses in a predetermined sequence of at least three selected wavelengths, the selected wavelengths being separated by a fixed, constant wavelength interval, the selected wavelengths being in quadrature relationship for a predetermined gap width;

generating a reference intensity signal indicative of the intensity of the each of the selected wavelengths in the optical beam;

directing the optical beam into the sensor and phase-modulating the optical beam in the sensor by the variation in the gap width, so that selected wavelengths are phase-shifted by respective phase shift angles in quadrature relationship, one of the phase shift angles being a base phase shift angle that is a known function of the gap width;

detecting the phase-modulated optical beam received from the sensor and generating a measured intensity signal indicative of the intensity of each of the selected wavelengths in the phase-modulated optical beam;

calculating the base phase shift angle from the ratios of the measured intensity signal to the reference intensity signal for each of the selected wavelengths;

calculating the gap width as a function of the base phase shift angle; and determining the parameter to be measured as a function of the gap width.

25. The method of claim 24, wherein the pulses of the selected wavelengths in the optical beam are of substantially equal amplitude.

26. The method of claim 25, wherein the optical beam comprises first and second beam portions of substantially equal intensities, wherein the step of generating a reference intensity signal comprises the steps of detecting the first beam portion and generating a reference intensity signal indicative of the intensity of each of the selected wavelengths in the first beam portion, wherein the second beam portion is directed to the sensor and is phase-modulated therein, and wherein the step of detecting the phase-modulated beam comprises the step of detecting the phase-modulated second beam portion.

27. A method for measuring a parameter, comprising the steps of:

providing a Fabry-Perot sensor that has a Fabry-Perot cavity with a gap width that varies as a known function of the value of the parameter to be measured;

generating an optical beam comprising a series of pulses, each of the pulses comprising substantially equal intensity components of at least three selected wavelengths, the selected wavelengths being separated by a fixed, constant wavelength interval, the selected wavelengths being in quadrature relationship for a predetermined gap width;

generating a reference intensity signal indicative of the intensity of the each of the selected wavelengths in the optical beam;

directing the optical beam into the sensor and phase-modulating the optical beam in the sensor by the variation in the gap width, so that selected wavelengths are phase-shifted by respective phase shift angles in quadrature relationship, one of the phase shift angles being a base phase shift angle that is a known function of the gap width;

detecting the phase-modulated optical beam received from the sensor and generating a measured intensity signal indicative of the intensity of each of the selected wavelengths in the phase-modulated optical beam;

calculating the base phase shift angle from the ratios of the measured intensity signal to the reference intensity signal for each of the selected wavelengths;

calculating the gap width as a function of the base phase shift angle; and determining the parameter to be measured as a function of the gap width.

28. The method of claim 27, wherein the optical beam comprises first and second beam portions of substantially equal intensities, wherein the step of generating a reference intensity signal comprises the steps of detecting the first beam portion and generating a reference intensity signal indicative of the intensity of each of the selected wavelengths in the first beam portion, wherein the second beam portion is directed to the sensor and is phase-modulated therein, and wherein the step of detecting the phase-modulated beam comprises the step of detecting the phase-modulated second beam portion.

29. The method of claim 28, wherein the step of detecting the phase-modulated second beam portion comprises the steps of:

splitting each of the pulses in the phase-modulated second beam portion into components corresponding to each of the selected wavelengths;

detecting each of the selected wavelengths separately; and generating a separate measured intensity signal for each of the selected wavelengths.

* * * * *